(12) United States Patent  (10) Patent No.: US 10,731,963 B2
Spargur  (45) Date of Patent: Aug. 4, 2020

(54) APPARATUS AND METHOD OF MEASURING MEDIA THICKNESS

(71) Applicant: Datamax-O'Neil Corporation, Orlando, FL (US)

(72) Inventor: David Spargur, Fullerton, CA (US)

(73) Assignee: DATAMAX-O'NEIL CORPORATION, Altamonte Springs, FL (US)

( * ) Notice: Subject to any disclaimer, the term of this patent is extended or adjusted under 35 U.S.C. 154(b) by 181 days.

(21) Appl. No.: 15/865,835

(22) Filed: Jan. 9, 2018

(65) Prior Publication Data

US 2019/0212123 A1    Jul. 11, 2019

(51) Int. Cl.
 *G01B 7/06* (2006.01)
 *G01B 21/08* (2006.01)

(52) U.S. Cl.
 CPC ............ *G01B 7/06* (2013.01); *G01B 7/10* (2013.01); *G01B 21/08* (2013.01); *G03G 2215/00738* (2013.01); *G06F 2201/88* (2013.01)

(58) Field of Classification Search
 CPC ........................................ G03G 2215/00738
 See application file for complete search history.

(56) References Cited

U.S. PATENT DOCUMENTS

| | | | |
|---|---|---|---|
| 2,507,529 A * | 5/1950 | Lipson | G01B 7/105 324/230 |
| 4,378,109 A | 3/1983 | Takahashi et al. | |
| 5,203,555 A | 4/1993 | Cannaverde et al. | |
| 5,575,075 A | 11/1996 | Sasaki | |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |

(Continued)

FOREIGN PATENT DOCUMENTS

| | | | |
|---|---|---|---|
| CN | 103743333 A | 4/2014 | |
| EP | 1148315 A2 * | 10/2001 | ........ B41J 11/0035 |
| WO | 2013163789 A1 | 11/2013 | |

*Primary Examiner* — Jennifer E Simmons
(74) *Attorney, Agent, or Firm* — Alston & Bird LLP

(57) ABSTRACT

An apparatus for determining the thickness of media is provided and includes a ferrous plate, a solenoid mounted perpendicular to the ferrous plate, and a magnet at the end of the solenoid piston. The solenoid piston ranges from a retract position to a down position where the magnet presses on media fed in the gap between the solenoid piston and the ferrous plate. A current source connected to the solenoid moves the piston to the retract position when the current source is energized. A detector is provided to determine when the solenoid piston is in the retract position. A programmable device controls the current source and a time measurement device. The programmable device simultaneously starts the time measurement device and increases current to the solenoid, thereby retracting the piston and timing the retraction.

20 Claims, 8 Drawing Sheets

(56) References Cited

U.S. PATENT DOCUMENTS

| | | |
|---|---|---|
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |

(56) References Cited

U.S. PATENT DOCUMENTS

| | | | |
|---|---|---|---|
| 8,978,984 | B2 | 3/2015 | Hennick et al. |
| 8,985,456 | B2 | 3/2015 | Zhu et al. |
| 8,985,457 | B2 | 3/2015 | Soule et al. |
| 8,985,459 | B2 | 3/2015 | Kearney et al. |
| 8,985,461 | B2 | 3/2015 | Gelay et al. |
| 8,988,578 | B2 | 3/2015 | Showering |
| 8,988,590 | B2 | 3/2015 | Gillet et al. |
| 8,991,704 | B2 | 3/2015 | Hopper et al. |
| 8,996,194 | B2 | 3/2015 | Davis et al. |
| 8,996,384 | B2 | 3/2015 | Funyak et al. |
| 8,998,091 | B2 | 4/2015 | Edmonds et al. |
| 9,002,641 | B2 | 4/2015 | Showering |
| 9,007,368 | B2 | 4/2015 | Laffargue et al. |
| 9,010,641 | B2 | 4/2015 | Qu et al. |
| 9,015,513 | B2 | 4/2015 | Murawski et al. |
| 9,016,576 | B2 | 4/2015 | Brady et al. |
| D730,357 | S | 5/2015 | Fitch et al. |
| 9,022,288 | B2 | 5/2015 | Nahill et al. |
| 9,030,964 | B2 | 5/2015 | Essinger et al. |
| 9,033,240 | B2 | 5/2015 | Smith et al. |
| 9,033,242 | B2 | 5/2015 | Gillet et al. |
| 9,036,054 | B2 | 5/2015 | Koziol et al. |
| 9,037,344 | B2 | 5/2015 | Chamberlin |
| 9,038,911 | B2 | 5/2015 | Xian et al. |
| 9,038,915 | B2 | 5/2015 | Smith |
| D730,901 | S | 6/2015 | Oberpriller et al. |
| D730,902 | S | 6/2015 | Fitch et al. |
| 9,047,098 | B2 | 6/2015 | Barten |
| 9,047,359 | B2 | 6/2015 | Caballero et al. |
| 9,047,420 | B2 | 6/2015 | Caballero |
| 9,047,525 | B2 | 6/2015 | Barber |
| 9,047,531 | B2 | 6/2015 | Showering et al. |
| 9,049,640 | B2 | 6/2015 | Wang et al. |
| 9,053,055 | B2 | 6/2015 | Caballero |
| 9,053,378 | B1 | 6/2015 | Hou et al. |
| 9,053,380 | B2 | 6/2015 | Xian et al. |
| 9,057,641 | B2 | 6/2015 | Amundsen et al. |
| 9,058,526 | B2 | 6/2015 | Powilleit |
| 9,061,527 | B2 | 6/2015 | Tobin et al. |
| 9,064,165 | B2 | 6/2015 | Havens et al. |
| 9,064,167 | B2 | 6/2015 | Xian et al. |
| 9,064,168 | B2 | 6/2015 | Todeschini et al. |
| 9,064,254 | B2 | 6/2015 | Todeschini et al. |
| 9,066,032 | B2 | 6/2015 | Wang |
| 9,070,032 | B2 | 6/2015 | Corcoran |
| D734,339 | S | 7/2015 | Zhou et al. |
| D734,751 | S | 7/2015 | Oberpriller et al. |
| 9,076,459 | B2 | 7/2015 | Braho et al. |
| 9,079,423 | B2 | 7/2015 | Bouverie et al. |
| 9,080,856 | B2 | 7/2015 | Laffargue |
| 9,082,023 | B2 | 7/2015 | Feng et al. |
| 9,084,032 | B2 | 7/2015 | Rautiola et al. |
| 9,087,250 | B2 | 7/2015 | Coyle |
| 9,092,681 | B2 | 7/2015 | Havens et al. |
| 9,092,682 | B2 | 7/2015 | Wilz et al. |
| 9,092,683 | B2 | 7/2015 | Koziol et al. |
| 9,093,141 | B2 | 7/2015 | Liu |
| D737,321 | S | 8/2015 | Lee |
| 9,098,763 | B2 | 8/2015 | Lu et al. |
| 9,104,929 | B2 | 8/2015 | Todeschini |
| 9,104,934 | B2 | 8/2015 | Li et al. |
| 9,107,484 | B2 | 8/2015 | Chaney |
| 9,111,159 | B2 | 8/2015 | Liu et al. |
| 9,111,166 | B2 | 8/2015 | Cunningham |
| 9,135,483 | B2 | 9/2015 | Liu et al. |
| 9,137,009 | B1 | 9/2015 | Gardiner |
| 9,141,839 | B2 | 9/2015 | Xian et al. |
| 9,147,096 | B2 | 9/2015 | Wang |
| 9,148,474 | B2 | 9/2015 | Skvoretz |
| 9,158,000 | B2 | 10/2015 | Sauerwein |
| 9,158,340 | B2 | 10/2015 | Reed et al. |
| 9,158,953 | B2 | 10/2015 | Gillet et al. |
| 9,159,059 | B2 | 10/2015 | Daddabbo et al. |
| 9,165,174 | B2 | 10/2015 | Huck |
| 9,171,543 | B2 | 10/2015 | Emerick et al. |
| 9,183,425 | B2 | 11/2015 | Wang |
| 9,189,669 | B2 | 11/2015 | Zhu et al. |
| 9,195,844 | B2 | 11/2015 | Todeschini et al. |
| 9,202,458 | B2 | 12/2015 | Braho et al. |
| 9,208,366 | B2 | 12/2015 | Liu |
| 9,208,367 | B2 | 12/2015 | Wangu |
| 9,219,836 | B2 | 12/2015 | Bouverie et al. |
| 9,224,022 | B2 | 12/2015 | Ackley et al. |
| 9,224,024 | B2 | 12/2015 | Bremer et al. |
| 9,224,027 | B2 | 12/2015 | Van Horn et al. |
| D747,321 | S | 1/2016 | London et al. |
| 9,230,140 | B1 | 1/2016 | Ackley |
| 9,235,553 | B2 | 1/2016 | Fitch et al. |
| 9,239,950 | B2 | 1/2016 | Fletcher |
| 9,245,492 | B2 | 1/2016 | Ackley et al. |
| 9,443,123 | B2 | 1/2016 | Hejl |
| 9,248,640 | B2 | 2/2016 | Heng |
| 9,250,652 | B2 | 2/2016 | London et al. |
| 9,250,712 | B1 | 2/2016 | Todeschini |
| 9,251,411 | B2 | 2/2016 | Todeschini |
| 9,258,033 | B2 | 2/2016 | Showering |
| 9,262,633 | B1 | 2/2016 | Todeschini et al. |
| 9,262,660 | B2 | 2/2016 | Lu et al. |
| 9,262,662 | B2 | 2/2016 | Chen et al. |
| 9,269,036 | B2 | 2/2016 | Bremer |
| 9,270,782 | B2 | 2/2016 | Hala et al. |
| 9,274,812 | B2 | 3/2016 | Doren et al. |
| 9,275,388 | B2 | 3/2016 | Havens et al. |
| 9,277,668 | B2 | 3/2016 | Feng et al. |
| 9,280,693 | B2 | 3/2016 | Feng et al. |
| 9,286,496 | B2 | 3/2016 | Smith |
| 9,297,900 | B2 | 3/2016 | Jiang |
| 9,298,964 | B2 | 3/2016 | Li et al. |
| 9,301,427 | B2 | 3/2016 | Feng et al. |
| D754,205 | S | 4/2016 | Nguyen et al. |
| D754,206 | S | 4/2016 | Nguyen et al. |
| 9,304,376 | B2 | 4/2016 | Anderson |
| 9,310,609 | B2 | 4/2016 | Rueblinger et al. |
| 9,313,377 | B2 | 4/2016 | Todeschini et al. |
| 9,317,037 | B2 | 4/2016 | Byford et al. |
| D757,009 | S | 5/2016 | Oberpriller et al. |
| 9,342,723 | B2 | 5/2016 | Liu et al. |
| 9,342,724 | B2 | 5/2016 | McCloskey |
| 9,361,882 | B2 | 6/2016 | Ressler et al. |
| 9,365,381 | B2 | 6/2016 | Colonel et al. |
| 9,373,018 | B2 | 6/2016 | Colavito et al. |
| 9,375,945 | B1 | 6/2016 | Bowles |
| 9,378,403 | B2 | 6/2016 | Wang et al. |
| D760,719 | S | 7/2016 | Zhou et al. |
| 9,360,304 | B2 | 7/2016 | Chang et al. |
| 9,383,848 | B2 | 7/2016 | Daghigh |
| 9,384,374 | B2 | 7/2016 | Bianconi |
| 9,390,596 | B1 | 7/2016 | Todeschini |
| D762,604 | S | 8/2016 | Fitch et al. |
| 9,411,386 | B2 | 8/2016 | Sauerwein |
| 9,412,242 | B2 | 8/2016 | Van Horn et al. |
| 9,418,269 | B2 | 8/2016 | Havens et al. |
| 9,418,270 | B2 | 8/2016 | Van Volkinburg et al. |
| 9,423,318 | B2 | 8/2016 | Lui et al. |
| D766,244 | S | 9/2016 | Zhou et al. |
| 9,443,222 | B2 | 9/2016 | Singel et al. |
| 9,454,689 | B2 | 9/2016 | McCloskey et al. |
| 9,464,885 | B2 | 10/2016 | Lloyd et al. |
| 9,465,967 | B2 | 10/2016 | Xian et al. |
| 9,478,113 | B2 | 10/2016 | Xie et al. |
| 9,478,983 | B2 | 10/2016 | Kather et al. |
| D771,631 | S | 11/2016 | Fitch et al. |
| 9,481,186 | B2 | 11/2016 | Bouverie et al. |
| 9,487,113 | B2 | 11/2016 | Schukalski |
| 9,488,986 | B1 | 11/2016 | Solanki |
| 9,489,782 | B2 | 11/2016 | Payne et al. |
| 9,490,540 | B1 | 11/2016 | Davies et al. |
| 9,491,729 | B2 | 11/2016 | Rautiola et al. |
| 9,497,092 | B2 | 11/2016 | Gomez et al. |
| 9,507,974 | B1 | 11/2016 | Todeschini |
| 9,519,814 | B2 | 12/2016 | Cudzilo |
| 9,521,331 | B2 | 12/2016 | Bessettes et al. |
| 9,530,038 | B2 | 12/2016 | Xian et al. |
| D777,166 | S | 1/2017 | Bidwell et al. |

(56) References Cited

U.S. PATENT DOCUMENTS

| | | |
|---|---|---|
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 2003/0235448 A1* | 12/2003 | Nemura .......... G03G 15/5029 399/389 |
| 2006/0275045 A1* | 12/2006 | Kawasaki ........ G03G 15/5029 399/45 |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0194692 A1 | 8/2012 | Mers et al. |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0332996 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0191684 A1 | 7/2014 | Valois |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0178685 A1 | 6/2015 | Krumel et al. |
| 2015/0186703 A1 | 7/2015 | Chen et al. |
| 2015/0199957 A1 | 7/2015 | Funyak et al. |

(56) References Cited

U.S. PATENT DOCUMENTS

| | | |
|---|---|---|
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0025697 A1 | 1/2016 | Alt et al. |
| 2016/0026838 A1 | 1/2016 | Gillet et al. |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron, Jr. et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschinie et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0199266 A1 | 7/2017 | Rice et al. |

(56) References Cited

U.S. PATENT DOCUMENTS

2017/0200108 A1 7/2017 Au et al.
2017/0200275 A1 7/2017 McCloskey et al.

* cited by examiner

APPARATUS AND METHOD OF MEASURING MEDIA THICKNESS

FIELD OF THE INVENTION

The present invention relates to an apparatus and method of measuring a media thickness, particularly on a printer.

BACKGROUND

Generally speaking, to achieve quality printing, knowing the thickness of the media being printed is important. If the printer can auto-detect the media thickness, then printing parameters can be set automatically, improving the print quality.

Therefore, a need exists for an apparatus and method of auto-detecting media thickness.

SUMMARY

Accordingly, in one aspect, the present invention embraces an apparatus for determining the thickness of media.

In an exemplary embodiment the apparatus is comprised of a ferrous plate, a solenoid with a solenoid piston mounted above the ferrous plate, and a magnet disposed on an end of the solenoid piston proximate to the ferrous plate. The solenoid piston motion is perpendicular to the ferrous plate. The solenoid piston has a range of motion between a retract position where the magnet is a predetermined distance above the ferrous plate and a down position where the magnet presses on media fed in the gap between the solenoid piston and the ferrous plate. The predetermined distance provides a gap to feed media between the solenoid piston and the ferrous plate. The apparatus further includes an electrical energy source connected to the solenoid. The solenoid piston is forced with a retracting force to the retract position when the electrical energy source energizes the solenoid to a predetermined level. The solenoid piston also includes a bias element to keep the solenoid piston in the down position when the electrical energy source is not energizing the solenoid. The apparatus further includes a detector configured to determine when the solenoid piston is in the retract position. The apparatus also includes a programmable device in communication with the detector. The programmable device controls the electrical energy source. The electrical energy source connected to the solenoid is configured to de-energize after the media is fed in the gap between the solenoid piston and the ferrous plate, causing the bias element to force the solenoid piston to the down position and the magnet to press the media to the ferrous plate. The programmable device is further configured to systematically and incrementally increase the electrical energy to the solenoid, thereby incrementally increasing the retracting force on the solenoid piston towards the retract position until the retracting force is greater than the magnetic force pressing the solenoid piston to the media and the force from the bias element, causing the solenoid piston to return to the retract position. The detector is configured to communicate that the solenoid piston is in the retract position to the programmable device. The programmable device is configured to stop the incremental increase of electrical energy to the solenoid based upon information that the solenoid piston is in the retract position. The programmable device is further configured to correlate data on the incremental electrical energy increases to bring the solenoid to the retract position with distance data; the distance being the distance between the ferrous plate and an end of the magnet in contact with the media.

In another exemplary embodiment, the apparatus further includes a time measurement device in communication with the programmable device. The electric energy source is a current source connected to the solenoid. The programmable device is configured to simultaneously start the time measurement device and to systematically and incrementally increase the current to the solenoid.

In another exemplary embodiment of the apparatus, the current source is a constant ramp current driver.

In another exemplary embodiment of the apparatus, the time measurement device is part of the programmable device. The programmable device is configured to measure time by program loops.

In another exemplary embodiment of the apparatus, the time measured by the time measurement device is proportional to the systematic current increase.

In another exemplary embodiment of the apparatus, the data is an algorithm which correlates the time measured by the time measurement device to media thickness.

In yet another exemplary embodiment of the apparatus, the data is a table which correlates the time measured by the time measurement device to media thickness.

In another exemplary embodiment of the apparatus, the electrical energy source is a voltage source. The apparatus further includes a digital-to-analog converter (DAC) controlled by the programmable device and connected to the voltage source. The programmable device is configured to systematically supply in steps, digital numbers to the DAC. The DAC is configured to convert the digital numbers to analog voltages at the voltage source, thereby supplying an incrementally increasing voltage to the solenoid in steps. The data on the incremental electrical energy increases to bring the solenoid to the retract position is the last digital number supplied to the DAC.

In another exemplary embodiment of the apparatus, the data is incorporated into an algorithm which correlates the last digital number output of the programmable device supplied to the DAC with media thickness.

In another exemplary embodiment of the apparatus, the data is correlated to a table which includes a correlation of the last digital number output of the programmable device supplied to the DAC with media thickness.

In another exemplary embodiment of the apparatus, the systematic increase in electrical energy is linear.

In another exemplary embodiment of the apparatus, the systematic increase in electrical energy is a predetermined non-linear function.

In another exemplary embodiment of the apparatus, the end of the magnet in contact with the media has a flat tip.

In yet another exemplary embodiment of the apparatus, the solenoid piston has a second end opposing the end proximate to the ferrous plate. The detector is a contact switch; the second end contacting the contact switch when the piston is in the retract position.

In another exemplary embodiment of the apparatus, the detector is a photo sensor.

In yet another exemplary embodiment of the apparatus, the programmable device is selected from a dedicated logic circuit, a complex programmable logic device, a programmable array logic device, firmware, and a central processing unit.

In another aspect, the present invention embraces a method for automatic media thickness detection.

In an exemplary embodiment, the method includes the steps of: (i) positioning a magnet mounted on a solenoid piston above a ferrous plate in a retract position, (ii) placing media between the ferrous plate and the magnet in the retract position, (iii) pushing the magnet to a down position such that the magnet clamps the media to the ferrous plate, (iv) retracting the magnet to the retract position, (v) measuring the time for the piston to reach the retract position from the down position, (vi) correlating the measured time to known distance values, and (vii) determining the thickness of the media based on the correlating step. The solenoid being mounted so that the piston motion is perpendicular to the ferrous plate.

In another exemplary embodiment of the method, the step of positioning the magnet in the retract position is accomplished by the step of: energizing the solenoid with a current source to a predetermined voltage, $V_{retract}$. The step of pushing the magnet to the down position is accomplished by the steps of biasing the magnet with a compression spring arranged on the piston above the magnet, and de-energizing the solenoid.

In another exemplary embodiment, the method further comprises the step of detecting the piston in the retract position. The step of detecting the piston in the retract position triggers a step of stopping the measuring step.

In yet another exemplary embodiment of the method, the detecting step is accomplished by a detector selected from contact switches and photo sensors.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces an apparatus for determining the thickness of media.

Figure 1:
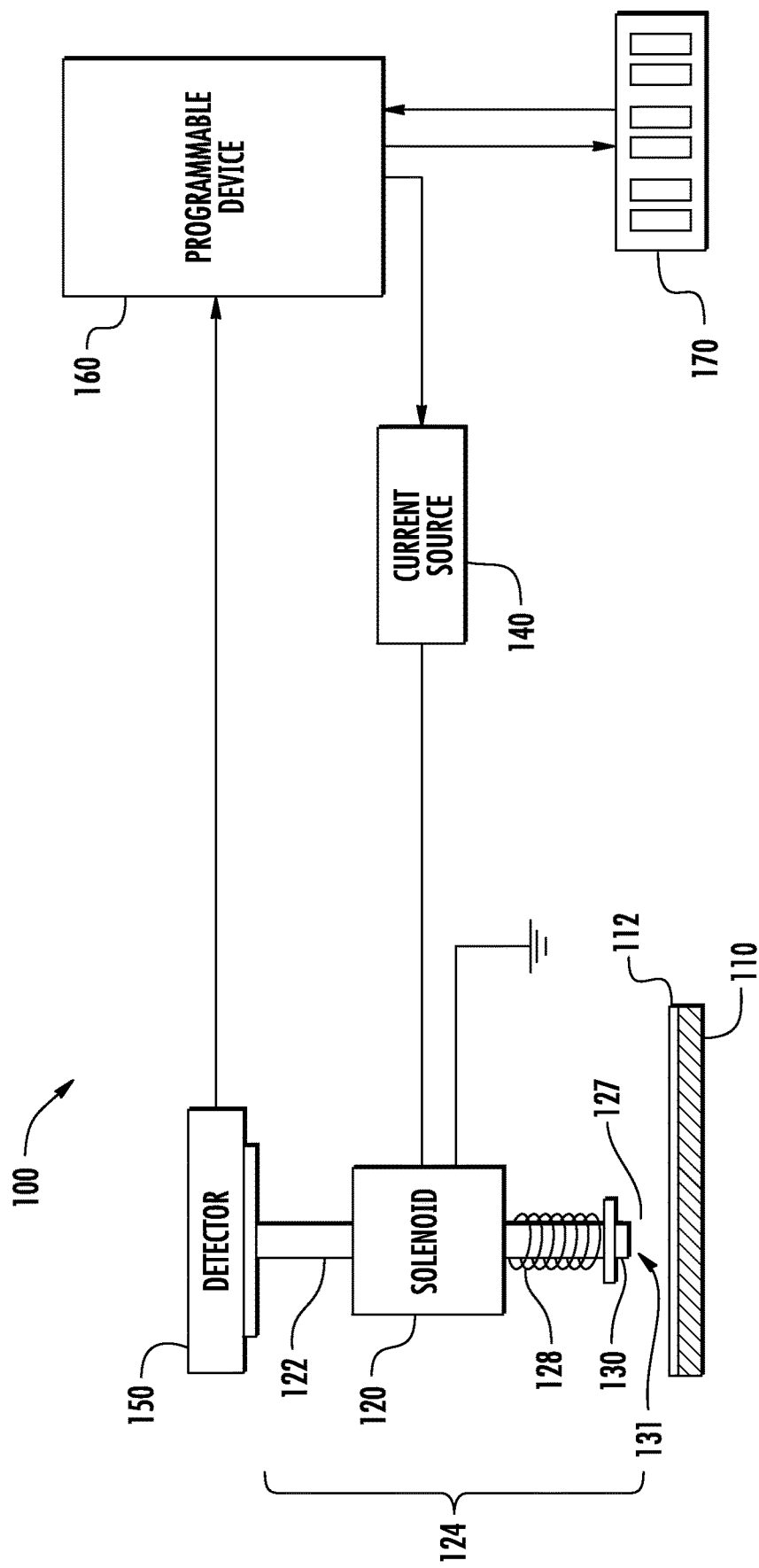
FIG. 1 schematically depicts in an exemplary embodiment, an apparatus for determining the thickness of media according the present invention wherein the electrical energy source is a current source, the solenoid being in the retract position.
Figure 2:
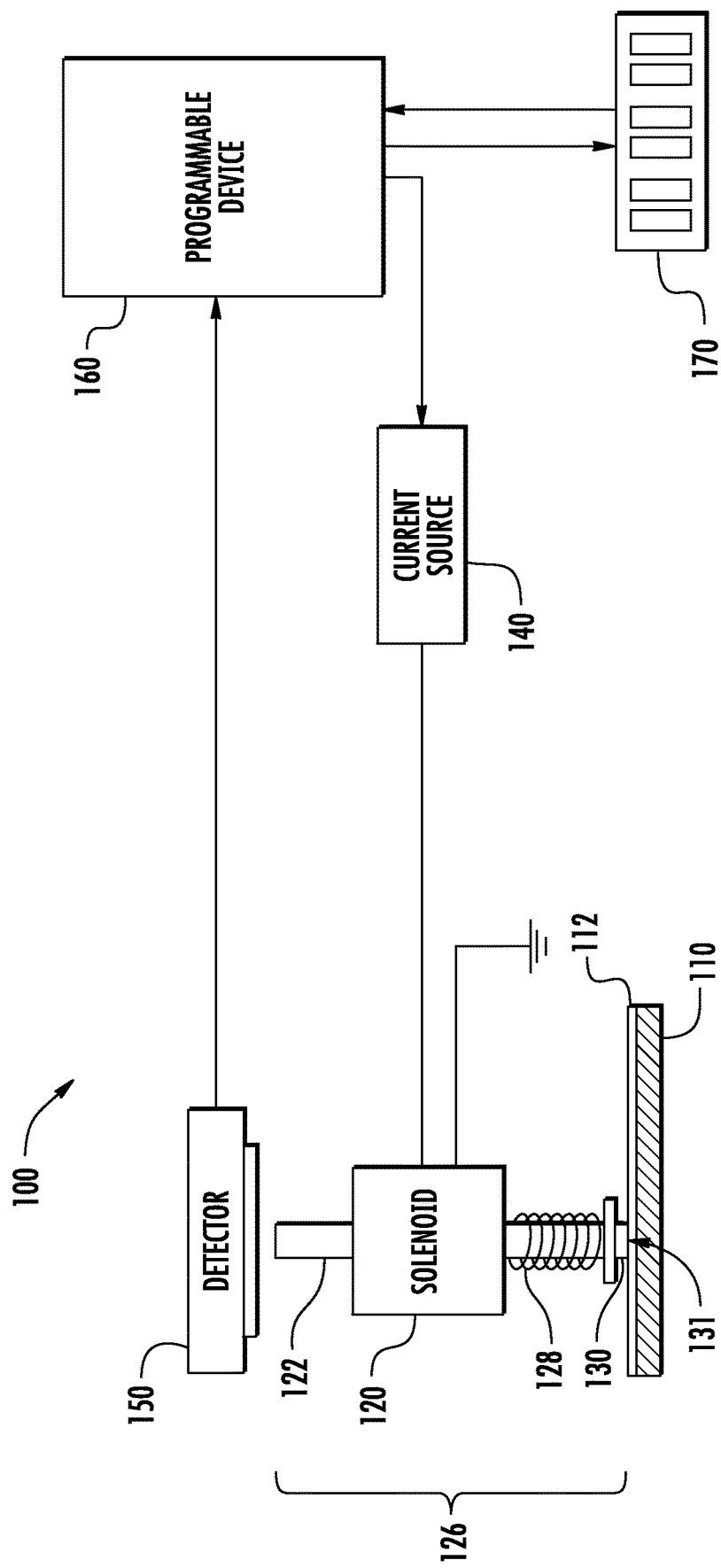
FIG. 2 schematically depicts the exemplary embodiment of FIG. 1, with the solenoid in the down position.

Referring to FIG. 1, in an exemplary embodiment, the apparatus (100) is general comprised of a ferrous plate (110), a solenoid (120) with a solenoid piston (122) mounted above the ferrous plate (110). The solenoid piston (122) range of motion is perpendicular to the ferrous plate (110). At the end of the solenoid piston (122) proximate to the ferrous plate (110), is disposed a magnet (130). The solenoid piston (122) has a range of motion between a retract position (124) where the magnet (130) is a predetermined distance above the ferrous plate (110), and a down position (shown in FIG. 2 as [126]) where the magnet (130) presses on media (112) fed in the gap (127) between the solenoid piston (122) and the ferrous plate (110). The predetermined distance provides a gap (127) to feed media (112) between the solenoid piston (122) and the ferrous plate (110). Also included in the apparatus (100) is a current source (140) connected to the solenoid (120). The solenoid piston (122) is forced with a retracting force to the retract position (124) when the current source (140) energizes the solenoid (120) to a predetermined current. The solenoid piston (122) has a bias element (128) to keep the solenoid piston (122) in the down position when the current source (140) is not energizing the solenoid (120). The apparatus further includes a detector (150) configured to determine when the solenoid piston is in the retract position (124). A programmable device (160) is provided in the apparatus (100). The programmable device (160) is in communication with the detector (150). Further, the programmable device (160) controls the current source (140). The apparatus further includes a time measurement device (170) in communication with the programmable device (160). In FIGS. 1 and 2, the time measurement device (170) is shown as a separate component. However, in an exemplary embodiment, the time measurement device (170) may be part of the programmable device (160). The programmable device may be configured to measure time by counting program loops. FIG. 2 shows the apparatus (100) in the down position (126). In FIG. 2, there is no gap between the magnet (130) and the media (112).

Continuing to refer to FIGS. 1 and 2, the current source (140) connected to the solenoid (120) is configured to de-energize after the media (112) is fed in the gap (127) between the magnet (130) on the solenoid piston (122) and the ferrous plate (110) in FIG. 1, causing the bias element (128) to force the solenoid piston (122) from the retract position (124) in FIG. 1 to the down position (126) in FIG. 2, causing the magnet (130) to press the media (112) to the ferrous plate (110). The programmable device (160) is configured to simultaneously start the time measurement device (170) and to systematically increase the current to the solenoid (120) via the current source (140). Thus, the retracting force is systematically increased on the solenoid piston (122) towards the retract position (124) until the retracting force is greater than the magnetic force pressing the solenoid piston (122) to the media (112) and the force from the bias element (128), thereby causing the solenoid piston (122) to return to the retract position (124). The programmable device (160) is further configured to stop the time measurement device (170) when the detector (150)

determines that the solenoid piston (122) is in the retract position (124) and communicates this to the programmable device (160).

In an exemplary embodiment of the apparatus (100) as shown in the Figures, the bias element (128) is a compression spring arranged around the solenoid piston (122). However, in another exemplary embodiment, the bias element may simply be the weight of the solenoid (120) itself which forces the solenoid piston into the down position (126).

In another exemplary embodiment of the apparatus (100) the end of the magnet (130) in contact with the media (112) has a flat tip (131) as shown in the Figures.

In FIGS. 1 and 2, the programmable device (160) may be a dedicated logic circuit, a complex programmable logic device, a programmable array logic device, firmware, or a central processing unit.

In another exemplary embodiment, the detector (150) is a contact switch. One end of the solenoid piston (122) touching the contact switch when the solenoid piston (122) is in the retract position (124) and closing the contact switch. The contact switch is part of a circuit which, when complete, will communicate this condition to the programmable device (160).

In another exemplary embodiment, the detector (150) is a photo sensor.

In an exemplary embodiment of the apparatus (100) as shown in the Figures, the systematic increase in current supplied to the solenoid (120) by the current source (140) is linear. In another exemplary embodiment, the current supplied is a predetermined non-linear function.

In an exemplary embodiment, the current source (140) may be a constant ramp current driver. The programmable device (160) controls the systematic increase of the current to the solenoid (120) with the constant ramp current driver.

Figure 3:
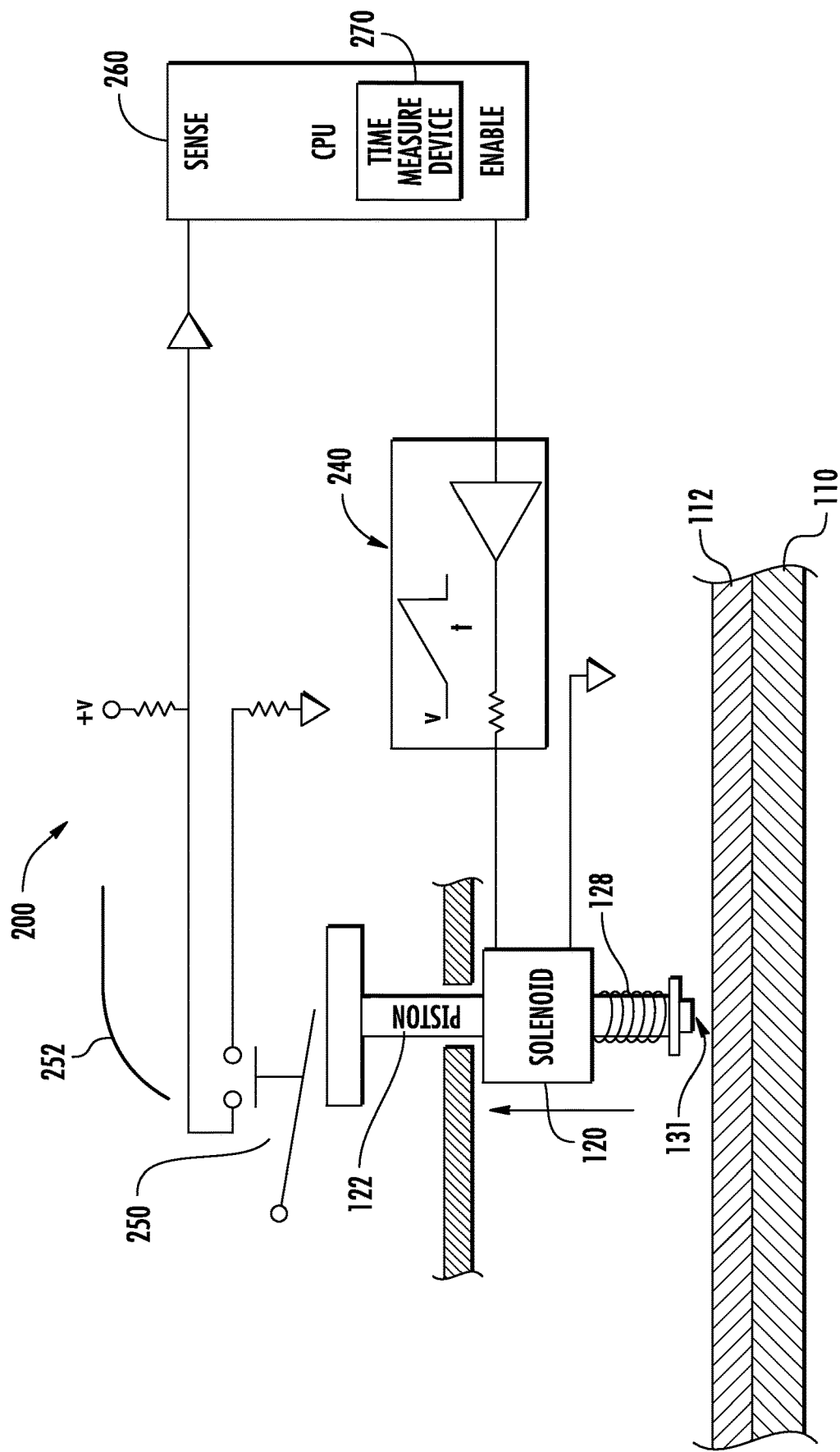
FIG. 3 schematically depicts another exemplary embodiment of the apparatus for determining the thickness of media wherein the electrical energy source is a current source according to the present invention.

For example, referring now to FIG. 3, an apparatus (200) in another exemplary embodiment of the invention is shown. The solenoid structure, solenoid (120), solenoid piston (122), bias element (128), and magnet (130) with a flat tip (131) are identical to FIGS. 1 and 2. In the present FIG. 3, the programmable device is a central processing unit (CPU) (260) which is in communication with the detector (250) and the current source (240). The detector (250) is shown as a contact switch which will complete a circuit (252) when the solenoid piston (122) is in the retract position. When the circuit (252) is complete, this information is transmitted to the CPU (260).

In the present FIG. 3, the current source (240) is a constant ramp current driver controlled by the CPU (260).

The time measurement device (270) is incorporated in the CPU (260) in the present FIG. 3, but may be a discrete device as in the previous Figures. As discussed hereinabove, the programmable device (260) may be configured to measure time by counting program loops.

Figure 4:
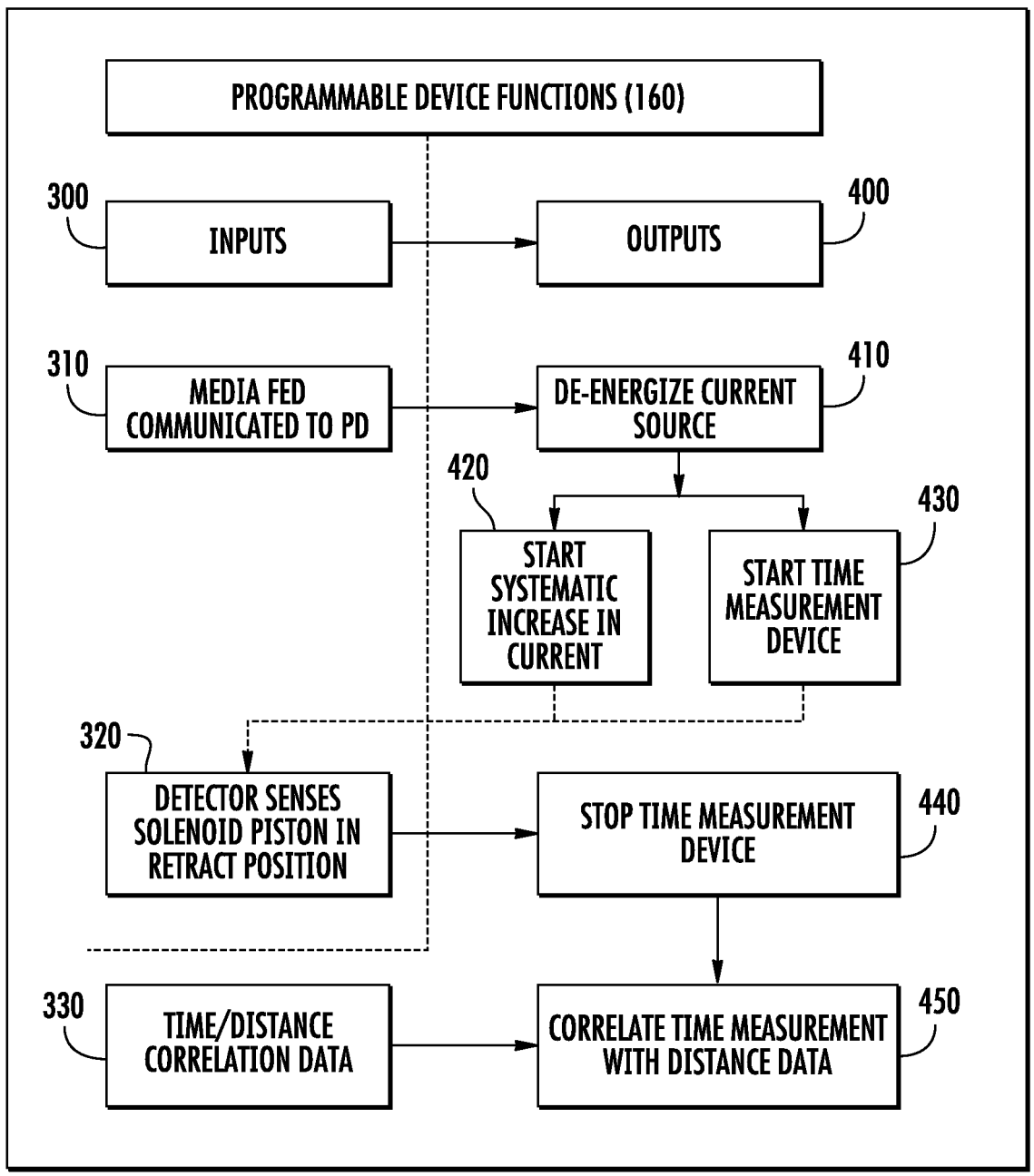
FIG. 4 schematically depicts in a flow chart the programmable device functions as a series of inputs and outputs to make the apparatus of FIG. 1 and FIG. 2 function in accordance with an exemplary embodiment of the present invention.

FIG. 4 illustrates the functions of the programmable device (160, 260) according to exemplary embodiments shown in FIGS. 1, 2, and 3 of the present invention. The Figure shows the functions as outputs (400) in response to inputs (300) to the programmable device (160, 260). For example, when media is fed (input 310) into the apparatus on the ferrous plate, this information is communicated to the programmable device (160, 260). The programmable device (160 260) is configured to communicate (output 410) to the current source to de-energize the solenoid. Input (310) may be based upon a sensor (not shown) sensing the media, and the sensor being in communication with the programmable device (160), resulting in the programmable device (160, 260) causing output (410). Alternatively, in another exemplary embodiment, an operator of the apparatus (100, 200) may provide input 310 that media has been fed to the programmable device (160, 260). As discussed hereinbefore, once the current source (140) de-energizes the solenoid (120), the biasing element (128) forces the solenoid piston into the down position. The programmable device (160, 260) has simultaneous outputs (420) to start a systematic increase in current in the current source (140) and (430) to start the time measurement device (170, 270). The detector (150, 250) sensing the solenoid piston is in the retract position (124) is input (320) to the programmable device (160, 260), and results in the output (440) of stopping the measurement device (170, 270).

In an exemplary embodiment, the programmable device (160, 260) is configured to correlate the time measured by the time measurement device (170, 260) with a distance, the distance being the distance between the ferrous plate (110) and an end of the magnet (130) in contact with the media (112). This is shown in FIG. 4 as output (450). The time/distance correlation data (input 330) may be accessed within the programmable device (160, 260), that is, the programmable device (160, 260), for example, in one exemplary embodiment, has access to data which correlates the time measured by the time measurement device (170, 270) to media thickness. In another exemplary embodiment, the programmable device (160, 260) has access to an algorithm which correlates the time measured by the time measurement device to media thickness.

In another exemplary embodiment, the time measured by the time measurement device is proportional to the systematic current increase.

Figure 5:
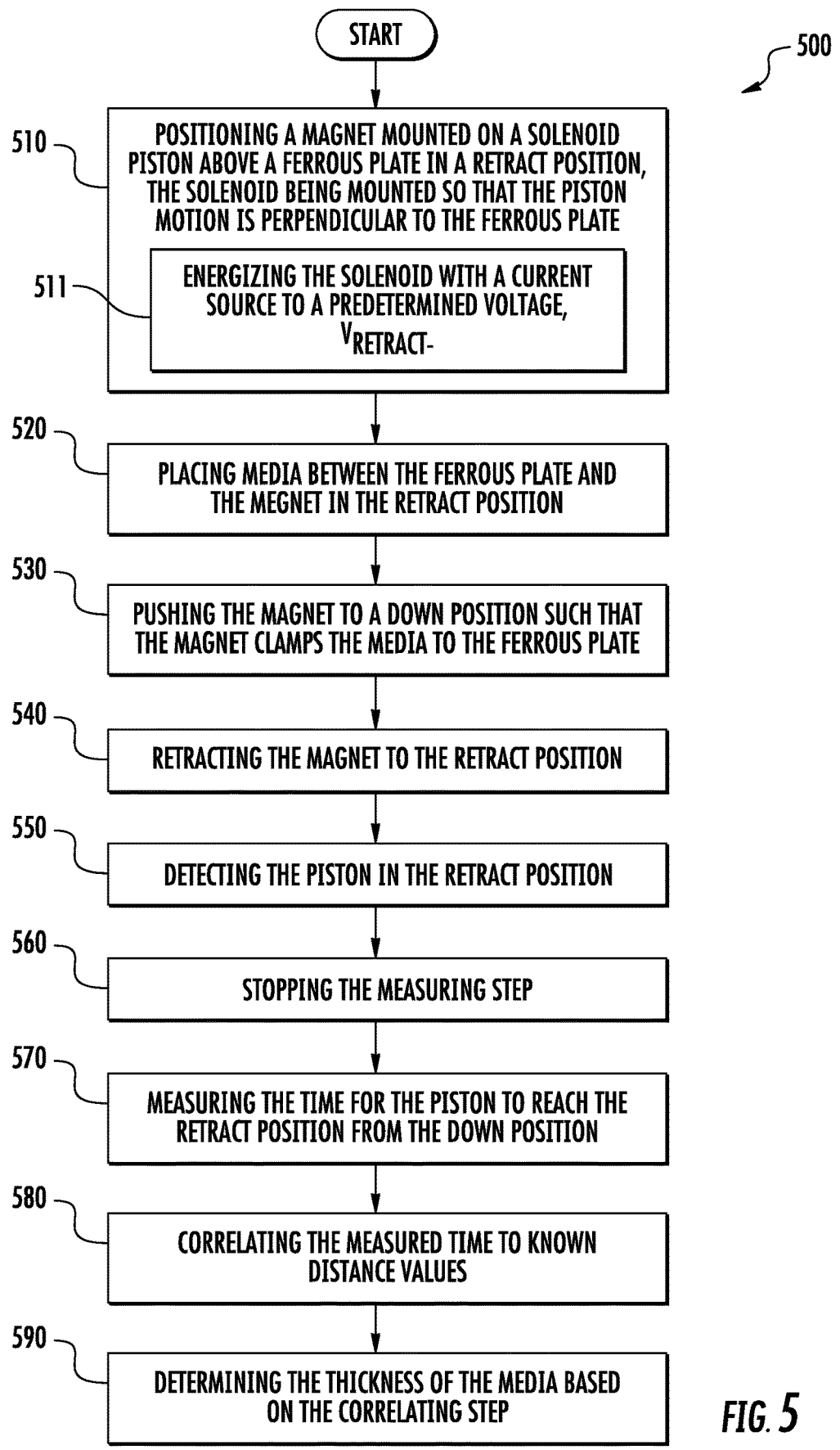
FIG. 5 schematically depicts in a flow chart, a method of determining the thickness of media in accordance with an exemplary embodiment of the present invention.

In another aspect, the invention embraces a method for automatic media thickness detection. Referring now to FIG. 5, the method (500) is shown in a flow chart.

In an exemplary embodiment, the method (500) is comprised of the steps of: (510) positioning a magnet mounted on a solenoid piston above a ferrous plate in a retract position; (520) placing media between the ferrous plate and the magnet in the retract position; (530) pushing the magnet to a down position such that the magnet clamps the media to the ferrous plate; (540) retracting the magnet to the retract position; (570) measuring the time for the piston to reach the retract position from the down position; (580) correlating the measured time to known distance values; and (590) determining the thickness of the media based on the correlating step.

In the (510) positioning step, the solenoid is mounted so that the piston motion is perpendicular to the ferrous plate.

In another exemplary embodiment of the method (500), the step (510) of positioning the magnet in the retract position is accomplished by the step of (511) energizing the solenoid with a current source to a predetermined voltage, $V_{retract}$.

In another exemplary embodiment, the method (500) further may comprise the step of (550) detecting the piston in the retract position, which triggers an additional step of (560) stopping the measuring step. The (550) detecting step may be accomplished for example, by a detector like a contact switch or a photo sensor.

Figure 6:
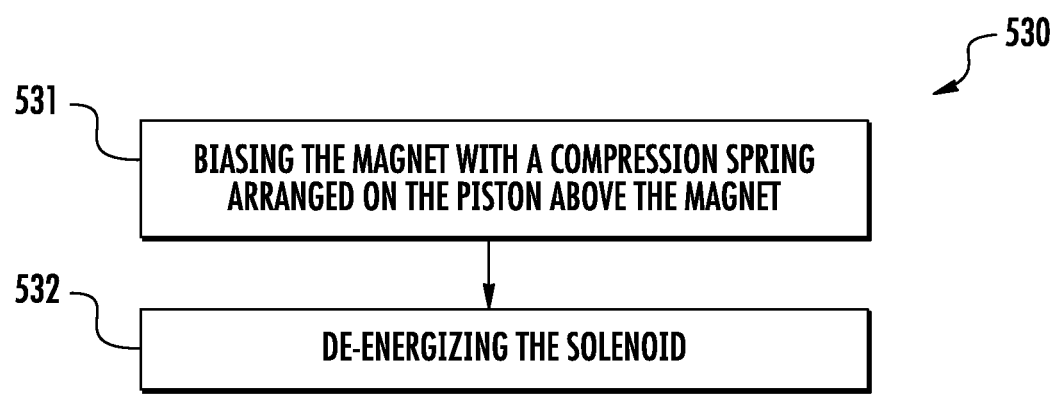
FIG. 6 schematically depicts in a flow chart, the steps to carry out the step of pushing the magnet into the down position of FIG. 3 in accordance with an exemplary embodiment of the present invention.

Referring now to FIG. 6, step of (530) pushing the magnet to the down position from FIG. 5 may be accomplished by the steps of (531) biasing the magnet with a compression spring arranged on the piston above the magnet, and (532) de-energizing the solenoid.

Advantageously, the method of FIG. 5 and FIG. 6 may be accomplished with the apparatuses discussed and described in relation to FIGS. 1-4.

The present invention further embraces an apparatus to measure the thickness of media using voltage steps.

Figure 7:
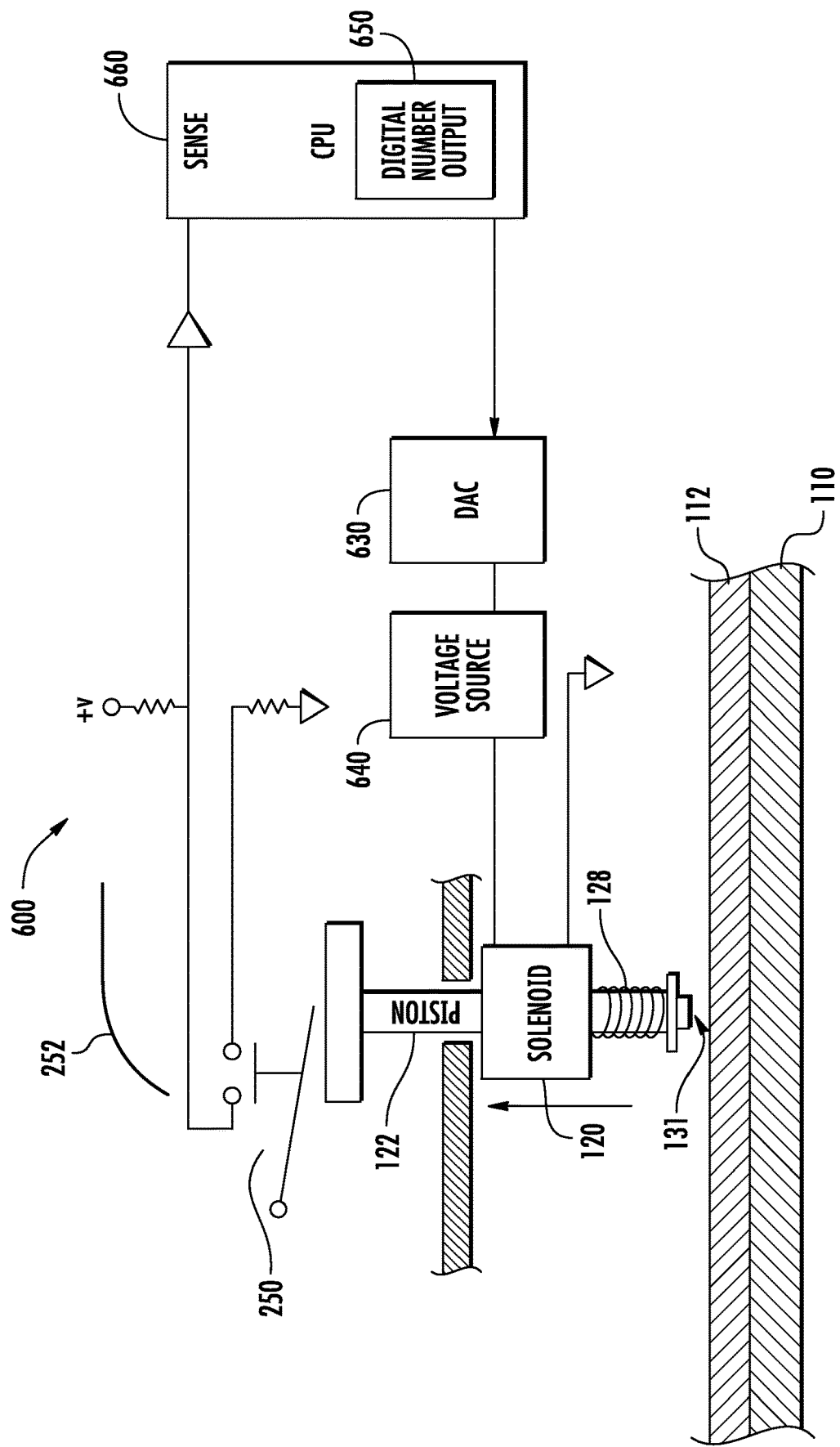
FIG. 7 schematically depicts another exemplary embodiment of the apparatus for determining the thickness of media wherein the electrical energy source is a voltage source according to the present invention.

Referring now to FIG. 7, in an exemplary embodiment, the apparatus (600) includes, as in the previous figures, the solenoid (120) with solenoid piston (122) oriented with the solenoid piston's (122) range of motion perpendicular to the ferrous plate (110). The solenoid piston (122) has a range of motion from a retract position away from the ferrous plate (110) to a down position where a magnet (130) on the end of the solenoid piston (122) proximate to the ferrous plate (110) touches the ferrous plate (110) or media (112) fed between the magnet (130) and the ferrous plate (110). Advantageously, the magnet (130) has a flat tip (131). A detector (250) is provided to sense when the solenoid piston (122) is in the retract position. As in embodiments discussed hereinbefore, the detector (250) may be a contact sensor, a photo sensor, or the like. A voltage source (640) is provided to supply voltage to the solenoid (120) to move the solenoid (120) to the retract position. A programmable device (660) is provided and is in communication with the detector (250). The programmable device may be a CPU as shown in the Figure, but could also be a dedicated logic circuit, a complex programmable logic device, a programmable array logic device, firmware or the like. The detector (250) communicates to the programmable device (660) when the solenoid piston (122) is in the retract position. The programmable device (660) outputs a digital signal at the digital signal or number output (650) to a digital-to-analog converter (DAC) (630). The DAC (630) in turn converts the digital signal to a voltage in the voltage source (640) to supply the solenoid (120). When media (112) is fed into the gap between the magnet (130) and the ferrous plate (110), the programmable device (660) is configured to output a digital signal at the digital signal or number output (650) to the DAC (630), and thus to the voltage source (640) to cause the voltage supplied to the solenoid (120) to be 0 volts. This communication of media feed may be supplied by a sensor (not shown) in communication with the programmable device (660) or by an operator of the apparatus (600). The solenoid piston (120) is provided with a bias element (128) which causes the solenoid piston to move to the down position when the supplied voltage is 0 volts. Once the solenoid piston (122) is in the down position, the programmable device is configured to cause the voltage source (640) to systematically, preferably in steps, to incrementally increase the voltage to the solenoid (120). This can be accomplished by the programmable device (660) providing a series of digital signals at the digital number output (650) to the DAC (630). The DAC (630) converts the digital signals to incrementally increasing analog voltages for the voltage source (640) to supply to the solenoid (120). The incrementally increasing voltage supplied to the solenoid (120) increases the retracting force on the solenoid piston (122) towards the retract position until the retracting force is greater than the magnetic force pressing the solenoid piston (122) to the media (112) and the force from the bias element (128), causing the solenoid piston (122) to return to the retract position. The detector (250) communicates the solenoid piston's (122) return to the retract position to the programmable device (660). The programmable device (660) stops the voltage increase via a signal from the digital number output (650) to the DAC (630). The programmable device (660) can correlate the last digital output number to a media thickness based upon access to data, a table or an algorithm which correlates voltage measurement to media thickness.

Figure 8:
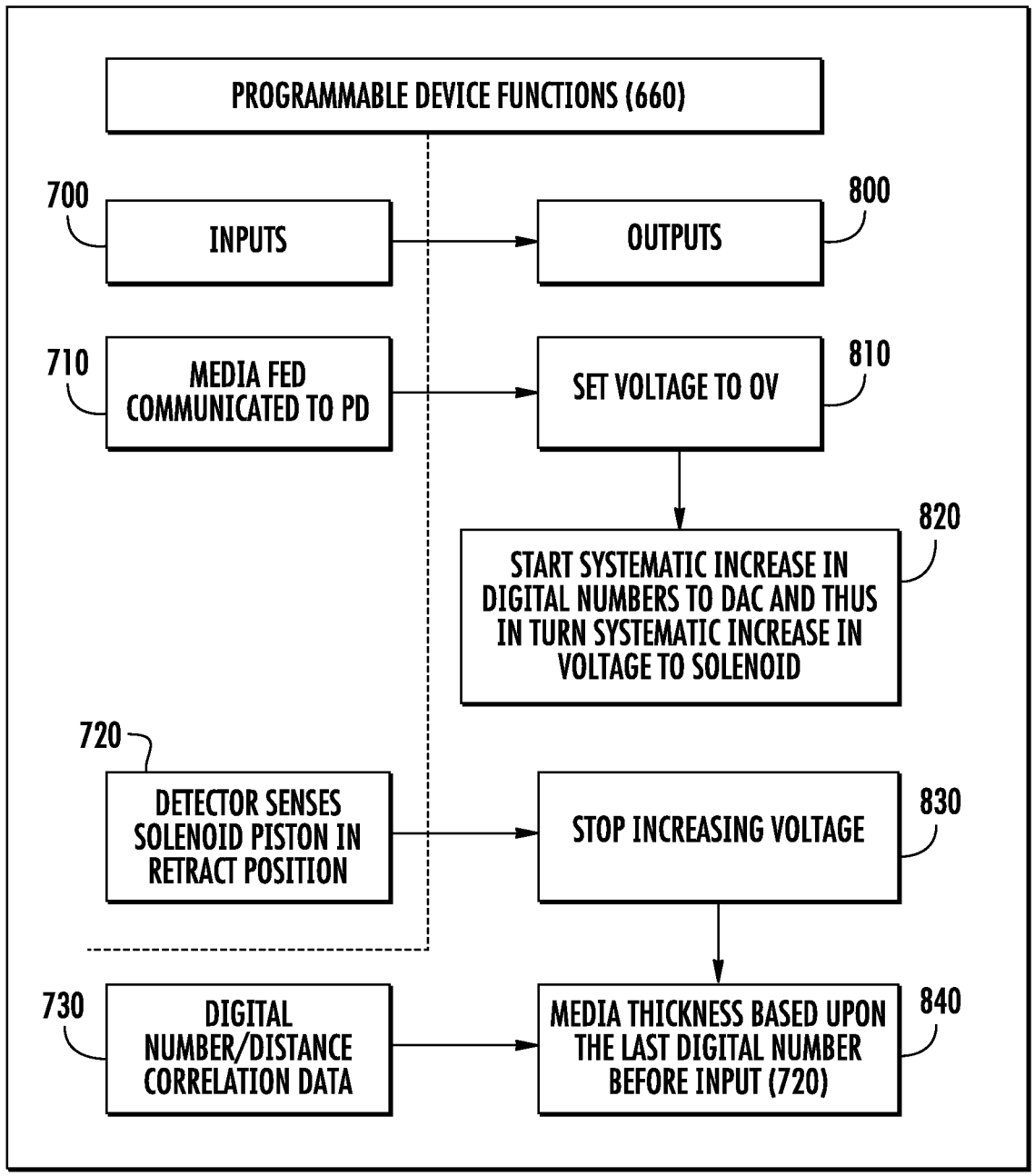
FIG. 8 schematically depicts in a flow chart the programmable device functions as a series of inputs and outputs to make the apparatus of FIG. 7 function in accordance with an exemplary embodiment of the present invention.

FIG. 8 depicts the input/output flow for the programmable device (660) for the embodiment described in conjunction with FIG. 7. The components in FIG. 7 of the apparatus (600) will be referred to in FIG. 8.

In FIG. 8, the Inputs (700) to the programmable device (660) and the Outputs (800) from the programmable device (660) are depicted in a flow chart. When media (112) is fed (Input 710) into the apparatus (600) on the ferrous plate (110), this information is communicated to the programmable device (660). The programmable device (660) is configured to cause the voltage to the voltage source (640) to be 0 Volts via the DAC (Output 810), de-energizing the solenoid (120). Input (310) may be based upon a sensor (not shown) sensing the media (112), and the sensor being in communication with the programmable device (660), resulting in the programmable device (660) causing Output (810). Alternatively, in another exemplary embodiment, an operator of the apparatus (600) may provide the information Input 710 to the programmable device (660) that media (112) has been fed. As discussed hereinbefore, once the voltage source (640) de-energizes the solenoid (120), the biasing element (128) forces the solenoid piston (122) into the down position. The programmable device (660) starts Output (820) to systematically increase the Digital number from the digital number output (650) to the DAC (630), which in turn systematically and incrementally increases the voltage to the solenoid (120). Due to the incremental increase in voltage, the solenoid piston (122) eventually reaches the retract position. The detector (250) sensing the solenoid piston (122) is in the retract position provides Input (720) to the programmable device (660), and results in the programmable device (660) Output (830) of stopping the increase in voltage. The programmable device (660) receives Input (730), which may be internal to the programmable device (660), of a digital number correlation to distance of solenoid piston retraction. Input (730) prompts the programmable device (660) to give Output (840): the media thickness based upon the last digital number output (820) before detector (250) Input (720) and the correlation data. Input (730) may be the result of a correlation of the last digital number output from the programmable device (660) to media thickness via known values stored in a table in the programmable device (660). Alternatively, in another exemplary embodiment, the last digital number output may be entered into an algorithm resident on the programmable device (660) which correlates the last digital number output to media thickness.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;

U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,599,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,596,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; U.S. Pat. No. 8,636,200; U.S. Pat. No. 8,636,212; U.S. Pat. No. 8,636,215; U.S. Pat. No. 8,636,224; U.S. Pat. No. 8,638,806; U.S. Pat. No. 8,640,958; U.S. Pat. No. 8,640,960; U.S. Pat. No. 8,643,717; U.S. Pat. No. 8,646,692; U.S. Pat. No. 8,646,694; U.S. Pat. No. 8,657,200; U.S. Pat. No. 8,659,397; U.S. Pat. No. 8,668,149; U.S. Pat. No. 8,678,285; U.S. Pat. No. 8,678,286; U.S. Pat. No. 8,682,077; U.S. Pat. No. 8,687,282; U.S. Pat. No. 8,692,927; U.S. Pat. No. 8,695,880; U.S. Pat. No. 8,698,949; U.S. Pat. No. 8,717,494; U.S. Pat. No. 8,717,494; U.S. Pat. No. 8,720,783; U.S. Pat. No. 8,723,804; U.S. Pat. No. 8,723,904; U.S. Pat. No. 8,727,223; U.S. Pat. No. 8,740,082; U.S. Pat. No. 8,740,085; U.S. Pat. No. 8,746,563; U.S. Pat. No. 8,750,445; U.S. Pat. No. 8,752,766; U.S. Pat. No. 8,756,059; U.S. Pat. No. 8,757,495; U.S. Pat. No. 8,760,563; U.S. Pat. No. 8,763,909; U.S. Pat. No. 8,777,108; U.S. Pat. No. 8,777,109; U.S. Pat. No. 8,779,898; U.S. Pat. No. 8,781,520; U.S. Pat. No. 8,783,573; U.S. Pat. No. 8,789,757; U.S. Pat. No. 8,789,758; U.S. Pat. No. 8,789,759; U.S. Pat. No. 8,794,520; U.S. Pat. No. 8,794,522; U.S. Pat. No. 8,794,525; U.S. Pat. No. 8,794,526; U.S. Pat. No. 8,798,367; U.S. Pat. No. 8,807,431; U.S. Pat. No. 8,807,432; U.S. Pat. No. 8,820,630; U.S. Pat. No. 8,822,848; U.S. Pat. No. 8,824,692; U.S. Pat. No. 8,824,696; U.S. Pat. No. 8,842,849; U.S. Pat. No. 8,844,822; U.S. Pat. No. 8,844,823; U.S. Pat. No. 8,849,019; U.S. Pat. No. 8,851,383; U.S. Pat. No. 8,854,633; U.S. Pat. No. 8,866,963; U.S. Pat. No. 8,868,421; U.S. Pat. No. 8,868,519; U.S. Pat. No. 8,868,802; U.S. Pat. No. 8,868,803; U.S. Pat. No. 8,870,074; U.S. Pat. No. 8,879,639; U.S. Pat. No. 8,880,426; U.S. Pat. No. 8,881,983; U.S. Pat. No. 8,881,987; U.S. Pat. No. 8,903,172; U.S. Pat. No. 8,908,995; U.S. Pat. No. 8,910,870; U.S. Pat. No. 8,910,875; U.S. Pat. No. 8,914,290; U.S. Pat. No. 8,914,788; U.S. Pat. No. 8,915,439; U.S. Pat. No. 8,915,444; U.S. Pat. No. 8,916,789; U.S. Pat. No. 8,918,250; U.S. Pat. No. 8,918,564; U.S. Pat. No. 8,925,818; U.S. Pat. No. 8,939,374; U.S. Pat. No. 8,942,480; U.S. Pat. No. 8,944,313; U.S. Pat. No. 8,944,327; U.S. Pat. No. 8,944,332; U.S. Pat. No. 8,950,678; U.S. Pat. No. 8,967,468; U.S. Pat. No. 8,971,346; U.S. Pat. No. 8,976,030; U.S. Pat. No. 8,976,368; U.S. Pat. No. 8,978,981; U.S. Pat. No. 8,978,983; U.S. Pat. No. 8,978,984; U.S. Pat. No. 8,985,456; U.S. Pat. No. 8,985,457; U.S. Pat. No. 8,985,459; U.S. Pat. No. 8,985,461; U.S. Pat. No. 8,988,578; U.S. Pat. No. 8,988,590; U.S. Pat. No. 8,991,704; U.S. Pat. No. 8,996,194; U.S. Pat. No. 8,996,384; U.S. Pat. No. 9,002,641; U.S. Pat. No. 9,007,368; U.S. Pat. No. 9,010,641; U.S. Pat. No. 9,015,513; U.S. Pat. No. 9,016,576; U.S. Pat. No. 9,022,288; U.S. Pat. No. 9,030,964; U.S. Pat. No. 9,033,240; U.S. Pat. No. 9,033,242; U.S. Pat. No. 9,036,054; U.S. Pat. No. 9,037,344; U.S. Pat. No. 9,038,911; U.S. Pat. No. 9,038,915; U.S. Pat. No. 9,047,098; U.S. Pat. No. 9,047,359; U.S. Pat. No. 9,047,420; U.S. Pat. No. 9,047,525; U.S. Pat. No. 9,047,531; U.S. Pat. No. 9,053,055; U.S. Pat. No. 9,053,378; U.S. Pat. No. 9,053,380; U.S. Pat. No. 9,058,526; U.S. Pat. No. 9,064,165; U.S. Pat. No. 9,064,165; U.S. Pat. No. 9,064,167; U.S. Pat. No. 9,064,168; U.S. Pat. No. 9,064,254; U.S. Pat. No. 9,066,032; U.S. Pat. No. 9,070,032; U.S. Pat. No. 9,076,459; U.S. Pat. No. 9,079,423; U.S. Pat. No. 9,080,856; U.S. Pat. No. 9,082,023; U.S. Pat. No. 9,082,031; U.S. Pat. No. 9,084,032; U.S. Pat. No. 9,087,250; U.S. Pat. No. 9,092,681; U.S. Pat. No. 9,092,682; U.S. Pat. No. 9,092,683; U.S. Pat. No. 9,093,141; U.S. Pat. No. 9,098,763; U.S. Pat. No. 9,104,929; U.S. Pat. No. 9,104,934; U.S. Pat. No. 9,107,484; U.S. Pat. No. 9,111,159; U.S. Pat. No. 9,111,166; U.S. Pat. No. 9,135,483; U.S. Pat. No. 9,137,009; U.S. Pat. No. 9,141,839; U.S. Pat. No. 9,147,096; U.S. Pat. No. 9,148,474; U.S. Pat. No. 9,158,000; U.S. Pat. No. 9,158,340; U.S. Pat. No. 9,158,953; U.S. Pat. No. 9,159,059; U.S. Pat. No. 9,165,174; U.S. Pat. No. 9,171,543; U.S. Pat. No. 9,183,425; U.S. Pat. No. 9,189,669; U.S. Pat. No. 9,195,844; U.S. Pat. No. 9,202,458; U.S. Pat. No. 9,208,366; U.S. Pat. No. 9,208,367; U.S. Pat. No. 9,219,836; U.S. Pat. No. 9,224,024; U.S. Pat. No. 9,224,027; U.S. Pat. No. 9,230,140; U.S. Pat. No. 9,235,553; U.S. Pat. No. 9,239,950; U.S. Pat. No. 9,245,492; U.S. Pat. No. 9,248,640; U.S. Pat. No. 9,250,652; U.S. Pat. No. 9,250,712; U.S. Pat. No. 9,251,411; U.S. Pat. No. 9,258,033; U.S. Pat. No. 9,262,633; U.S. Pat. No. 9,262,660; U.S. Pat. No. 9,262,662; U.S. Pat. No. 9,269,036; U.S. Pat. No. 9,270,782; U.S. Pat. No. 9,274,812; U.S. Pat. No. 9,275,388; U.S. Pat. No. 9,277,668; U.S. Pat. No. 9,280,693; U.S. Pat. No. 9,286,496; U.S. Pat. No. 9,298,964; U.S. Pat. No. 9,301,427; U.S. Pat. No. 9,313,377; U.S. Pat. No. 9,317,037; U.S. Pat. No. 9,319,548; U.S. Pat. No. 9,342,723; U.S. Pat. No. 9,361,882; U.S. Pat. No. 9,365,381; U.S. Pat. No. 9,373,018; U.S. Pat. No. 9,375,945; U.S. Pat. No. 9,378,403; U.S. Pat. No. 9,383,848; U.S. Pat. No. 9,384,374; U.S. Pat. No. 9,390,304; U.S. Pat. No. 9,390,596; U.S. Pat. No. 9,411,386; U.S. Pat. No. 9,412,242; U.S. Pat. No. 9,418,269; U.S. Pat. No. 9,418,270; U.S. Pat. No. 9,465,967; U.S. Pat. No. 9,423,318; U.S. Pat. No. 9,424,454; U.S. Pat. No. 9,436,860; U.S. Pat. No. 9,443,123; U.S. Pat. No. 9,443,222; U.S. Pat. No. 9,454,689; U.S. Pat. No. 9,464,885; U.S. Pat. No. 9,465,967; U.S. Pat. No. 9,478,983; U.S. Pat. No. 9,481,186; U.S. Pat. No. 9,487,113; U.S. Pat. No. 9,488,986; U.S. Pat. No. 9,489,782; U.S. Pat. No. 9,490,540; U.S. Pat. No. 9,491,729; U.S. Pat. No. 9,497,092; U.S. Pat. No. 9,507,974; U.S. Pat. No. 9,519,814;

U.S. Pat. No. 9,521,331; U.S. Pat. No. 9,530,038;
U.S. Pat. No. 9,572,901; U.S. Pat. No. 9,558,386;
U.S. Pat. No. 9,606,581; U.S. Pat. No. 9,646,189;
U.S. Pat. No. 9,646,191; U.S. Pat. No. 9,652,648;
U.S. Pat. No. 9,652,653; U.S. Pat. No. 9,656,487;
U.S. Pat. No. 9,659,198; U.S. Pat. No. 9,680,282;
U.S. Pat. No. 9,697,401; U.S. Pat. No. 9,701,140;
U.S. Design Pat. No. D702,237;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D734,339;
U.S. Design Pat. No. D737,321;
U.S. Design Pat. No. D754,205;
U.S. Design Pat. No. D754,206;
U.S. Design Pat. No. D757,009;
U.S. Design Pat. No. D760,719;
U.S. Design Pat. No. D762,604;
U.S. Design Pat. No. D766,244;
U.S. Design Pat. No. D777,166;
U.S. Design Pat. No. D771,631;
U.S. Design Pat. No. D783,601;
U.S. Design Pat. No. D785,617;
U.S. Design Pat. No. D785,636;
U.S. Design Pat. No. D790,505;
U.S. Design Pat. No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;

U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;
U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;

U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An apparatus for determining the thickness of media, comprising:
    a ferrous plate;
    a solenoid with a solenoid piston mounted above the ferrous plate, the solenoid piston motion being perpendicular to the ferrous plate;
    a magnet disposed on an end of the solenoid piston proximate to the ferrous plate;
    the solenoid piston having a range of motion between a retract position where the magnet is a predetermined distance above the ferrous plate, the predetermined distance providing a gap to feed media between the solenoid piston and the ferrous plate and a down position where the magnet presses on media fed in the gap between the solenoid piston and the ferrous plate;
    an electrical energy source connected to the solenoid;
    the solenoid piston being forced with a retracting force to the retract position when the electrical energy source energizes the solenoid to a predetermined level;
    the solenoid piston having a bias element to keep the solenoid piston in the down position when the electrical energy source is not energizing the solenoid;
    a detector configured to determine when the solenoid piston is in the retract position; and
    a programmable device in communication with the detector, the programmable device controlling the electrical energy source;
    wherein, the electrical energy source connected to the solenoid is configured to de-energize after the media is fed in the gap between the solenoid piston and the ferrous plate, causing the bias element to force the solenoid piston to the down position and the magnet to press the media to the ferrous plate;
    wherein, the programmable device is configured to systematically and incrementally increase the electrical energy to the solenoid, thereby incrementally increasing the retracting force on the solenoid piston towards the retract position until the retracting force is greater than the magnetic force pressing the solenoid piston to the media and the force from the bias element, causing the solenoid piston to return to the retract position;
    wherein, the detector is configured to communicate that the solenoid piston is in the retract position to the programmable device;
    wherein, the programmable device is configured to stop the incremental increase of electrical energy to the solenoid based upon information that the solenoid piston is in the retract position; and
    wherein, the programmable device is further configured to correlate data on the incremental electrical energy increases to bring the solenoid to the retract position with distance data, the distance being the distance between the ferrous plate and an end of the magnet in contact with the media.

2. The apparatus of claim 1 further comprising a time measurement device in communication with the programmable device; wherein the electric energy source is a current source connected to the solenoid; wherein, the programmable device is configured to simultaneously start the time measurement device and to systematically and incrementally increase the current to the solenoid.

3. The apparatus of claim 2, wherein the current source is a constant ramp current driver.

4. The apparatus of claim 2, wherein the time measurement device is part of the programmable device; the programmable device being configured to measure time by program loops.

5. The apparatus of claim 2, wherein the time measured by the time measurement device is proportional to the systematic current increase.

6. The apparatus of claim 2, wherein the data is an algorithm which correlates the time measured by the time measurement device to media thickness.

7. The apparatus of claim 2, wherein the data is a table which correlates the time measured by the time measurement device to media thickness.

8. The apparatus of claim 1, wherein the electrical energy source is a voltage source, and wherein the apparatus further comprises a digital-to-analog converter (DAC) controlled by the programmable device and connected to the voltage source; wherein, the programmable device is configured to systematically supply in steps, digital numbers to the DAC;
wherein, the DAC is configured to convert the digital numbers to analog voltages at the voltage source, thereby supplying an incrementally increasing voltage to the solenoid in steps; and
wherein the data on the incremental electrical energy increases to bring the solenoid to the retract position is the last digital number supplied to the DAC.

9. The apparatus of claim 8, wherein the data is incorporated into an algorithm which correlates the last digital number output of the programmable device supplied to the DAC with media thickness.

10. The apparatus of claim 8, wherein the data is correlated to a table which includes a correlation of the last digital number output of the programmable device supplied to the DAC with media thickness.

11. The apparatus of claim 1, wherein the systematic increase in electrical energy is linear.

12. The apparatus of claim 1, wherein the systematic increase in electrical energy is a predetermined non-linear function.

13. The apparatus of claim 1, wherein the end of the magnet in contact with the media has a flat tip.

14. The apparatus of claim 1, wherein the solenoid piston has a second end opposing the end proximate to the ferrous plate; and wherein the detector is a contact switch, the second end contacting the contact switch when the piston is in the retract position.

15. The apparatus of claim 1, wherein the detector is a photo sensor.

16. The apparatus of claim 1, wherein the programmable device is selected from a dedicated logic circuit, a complex programmable logic device, a programmable array logic device, firmware, and a central processing unit.

17. A method for automatic media thickness detection, comprising:
positioning a magnet mounted on a solenoid piston above a ferrous plate in a retract position, the solenoid being mounted so that the piston motion is perpendicular to the ferrous plate;
placing media between the ferrous plate and the magnet in the retract position;
pushing the magnet to a down position such that the magnet clamps the media to the ferrous plate;
retracting the magnet to the retract position;
measuring the time for the piston to reach the retract position from the down position;
correlating the measured time to known distance values; and
determining the thickness of the media based on the correlating step.

18. The method of claim 17, wherein the step of positioning the magnet in the retract position is accomplished by the step of:
energizing the solenoid with a current source to a predetermined voltage, $V_{retract}$; and
wherein the step of pushing the magnet to the down position is accomplished by the steps of:
biasing the magnet with a compression spring arranged on the piston above the magnet; and
de-energizing the solenoid.

19. The method of claim 17, comprising, the step of detecting the piston in the retract position; wherein the step of detecting the piston in the retract position triggers a step of stopping the measuring step.

20. The method of claim 1, wherein the detecting step is accomplished by a detector selected from contact switches and photo sensors.

* * * * *